United States Patent
Ganapathi et al.

(10) Patent No.: US 8,676,983 B2
(45) Date of Patent: *Mar. 18, 2014

(54) BALANCING THE LOADS OF SERVERS IN A SERVER FARM BASED ON AN ANGLE BETWEEN TWO VECTORS

(75) Inventors: Pramod Ganapathi, Bangalore (IN); Darshan S. Palasamudram, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/405,326

(22) Filed: Feb. 26, 2012

(65) Prior Publication Data
US 2012/0158941 A1 Jun. 21, 2012

Related U.S. Application Data

(63) Continuation of application No. 12/954,058, filed on Nov. 24, 2010.

(51) Int. Cl.
*G06F 15/16* (2006.01)

(52) U.S. Cl.
USPC .......................................... 709/226; 709/229

(58) Field of Classification Search
USPC ......................................... 709/223, 226, 229
See application file for complete search history.

(56) References Cited

U.S. PATENT DOCUMENTS

| | | | |
|---|---|---|---|
| 6,578,068 B1 | 6/2003 | Bowman-Amuah | |
| 6,748,414 B1 | 6/2004 | Bournas | |
| 7,620,687 B2 | 11/2009 | Chen et al. | |
| 2002/0032777 A1 | 3/2002 | Kawata et al. | |
| 2002/0049842 A1 | 4/2002 | Huetsch et al. | |
| 2004/0210636 A1 | 10/2004 | Dani et al. | |

(Continued)

FOREIGN PATENT DOCUMENTS

| | | | | |
|---|---|---|---|---|
| WO | 2012075884 A1 | 6/2012 | | |
| WO | WO 2012075884 A1 | * | 6/2012 | .............. G06F 17/30 |

OTHER PUBLICATIONS

Tong et al., "An Efficient Dynamic Load Balancing Scheme for Heterogenous Processing System," 2009 International Conference on Computational Intelligence and Natural Computing, pp. 319-322.

(Continued)

*Primary Examiner* — Thomas Dailey
*Assistant Examiner* — Ebrahim Golabbakhsh
(74) *Attorney, Agent, or Firm* — Robert A. Voigt, Jr.; Winstead, P.C.

(57) ABSTRACT

A method for balancing the loads of servers in a server farm. A vector, referred to herein as the "DesiredVector," is computed to hold the load factors for each of the servers. Upon receipt of a client request, a vector, referred to herein as the "ActiveConnections," is modified for each scenario where the new client request is considered to be serviced by a different server. The ActiveConnections vector holds the current number of client requests being serviced by each of the servers. Angles made by each of the different ActiveConnections vectors with the DesiredVector are computed. Upon identifying the ActiveConnections vector that produces the smallest angle with the DesiredVector, the client request is directed to the server which corresponds to the identified ActiveConnections vector. In this manner, the best possible distribution of requests among the servers is made for every client connection.

7 Claims, 3 Drawing Sheets

(56) References Cited

U.S. PATENT DOCUMENTS

| | | | |
|---|---|---|---|
| 2006/0036743 A1* | 2/2006 | Deng et al. | 709/227 |
| 2006/0224773 A1 | 10/2006 | Degenaro et al. | |
| 2007/0143460 A1 | 6/2007 | Ben-David et al. | |
| 2010/0057828 A1 | 3/2010 | Hofmann et al. | |

OTHER PUBLICATIONS

"Job Scheduling Algorithms in Linux Virtual Server," Nov. 20, 1998, http://www.linuxvirtualserver.org/docs/scheduling.html.

"LVS Scheduling Overview," 2009, https://www.redhat.com/docs/en-US/Red_Hat_Enterprise_Linux/5/html/Virtual_Server_Administration/s1-lvs-scheduling-VSA.html.

"Weighted Least-Connection Scheduling," Dec. 17, 2006, http://kb.linuxvirtualserver.org/wiki/Weighted_Least-Connection_Scheduling.

Chhabra et al., "Qualiative Parametric Comparison of Load Balancing Algorithms in Parallel and Distributed Computing Environment," World Academy of Science, Engineering and Technology, Apr. 2006.

Sharma et al., "Performance Analysis of Load Balancing Algorithms," World Academy of Science, Engineering and Technology, Apr. 28, 2008.

Office Action for U.S. Appl. No. 12/954,058 dated Jun. 5, 2013.

\* cited by examiner

BALANCING THE LOADS OF SERVERS IN A SERVER FARM BASED ON AN ANGLE BETWEEN TWO VECTORS

CROSS-REFERENCE TO RELATED APPLICATIONS

The present application is a continuation application of pending U.S. patent application Ser. No. 12/954,058, which was filed on Nov. 24, 2010, which is assigned to the assignee of the present invention. The present application claims priority benefits to U.S. patent application Ser. No. 12/954,058.

TECHNICAL FIELD

The present invention relates to a load balancing system, and more particularly to balancing the loads of servers in a server farm based on an angle between a vector that holds the values of the load factors for each of the servers in the server farm and a vector that holds a number of client requests to be serviced by each of the servers.

BACKGROUND

Generally, a load balancing system includes a set of clients and a set of servers with a unit, referred to as a "load balancer," between them. The clients issue a service or a content request to be serviced by any of the servers in the set of servers, commonly referred to as a "server farm." The load balancer determines which server in the server farm is going to service the client request.

Since different servers in the server farm will have a different capacity to handle requests (i.e., different capacity in the number of connections the servers can service), the load balancer will attempt to optimally distribute the incoming client requests to the servers in the server farm so that none of the servers become overloaded and that services retain high availability. Distributing workload, such as client requests, among servers in the server farm in a manner that attempts to optimize resource utilization, maximize throughput, minimize response time and avoid overload is referred to as "load balancing."

Currently, one of the main techniques for implementing load balancing is the "weighted least connection scheduling" technique. In such a technique, the servers in the server farm are assigned a weight based on the capacity to handle client requests. Servers with a higher weight value receive a larger percentage of connections at any one time. When there is a client request, the load balancer uses this weight to determine the percentage of the current number of connections to give each server. As a result, more requests are distributed to those servers with fewer active connections relative to their capacities (assigned weight).

However, the weighted least connection scheduling technique initially distributes one connection to each of the servers irrespective of their weights which may not effectively achieve load balancing. Furthermore, the weighted least connection scheduling technique distributes the new client request in a manner that neutralizes the current state of instability which may in the future not turn out to be the best possible distribution of requests among the servers to achieve effective load balancing.

Other load balancing techniques suffer drawbacks as well. For example, the weighted round-robin scheduling approach can lead to the overloading of one server while under utilizing the other servers in the server farm.

As a result, the current load balancing techniques may not distribute the incoming client requests among the servers in the server farm in such a manner as to optimize load balancing (i.e., optimize resource utilization, maximize throughput, minimize response time and avoid overload).

BRIEF SUMMARY

In one embodiment of the present invention, a method for balancing the loads of servers comprises receiving a load factor for each server in a server farm. The method further comprises computing a first vector to hold the load factor for each server in the server farm. Additionally, the method comprises receiving a client request. In addition, the method comprises computing a plurality of second vectors, where each of the plurality of second vectors holds a number of client requests to be serviced by each server in the server farm taking into consideration the received client request. Each of the plurality of second vectors is computed by modifying a third vector to attribute the client request being serviced by a different server in the server farm, where the third vector holds a current number of client requests being serviced by each server in the server farm. Furthermore, the method comprises computing an angle made by each of the plurality of second vectors with the first vector. The method further comprises identifying one of the plurality of second vectors which makes a smallest angle with the first vector. In addition, the method comprises directing, by a load balancer, the client request to a server in the server farm that corresponds to the identified second vector.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for balancing the loads of servers in the server farm. In one embodiment of the present invention, a vector, referred to herein as the "DesiredVector," is computed to hold the load factors for each of the servers in the server farm. Upon receipt of a client request, a vector, referred to herein as the "ActiveConnections," is modified for each scenario where the new client request is considered to be serviced by a different server in the server farm. The ActiveConnections vector holds the current number of client requests being serviced by each of the servers in the server farm. Angles made by each of the different ActiveConnections vectors with the DesiredVector are computed. Upon identifying the ActiveConnections vector that produces the smallest angle with the DesiredVector, the new client request is directed to the server which corresponds to the identified ActiveConnections vector. In this manner, the best possible distribution of requests among the servers of the server farm is made for every client connection. That is, the distribution of client requests is as close as possible to the expected distribution (the distribution shown in the DesiredVector).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
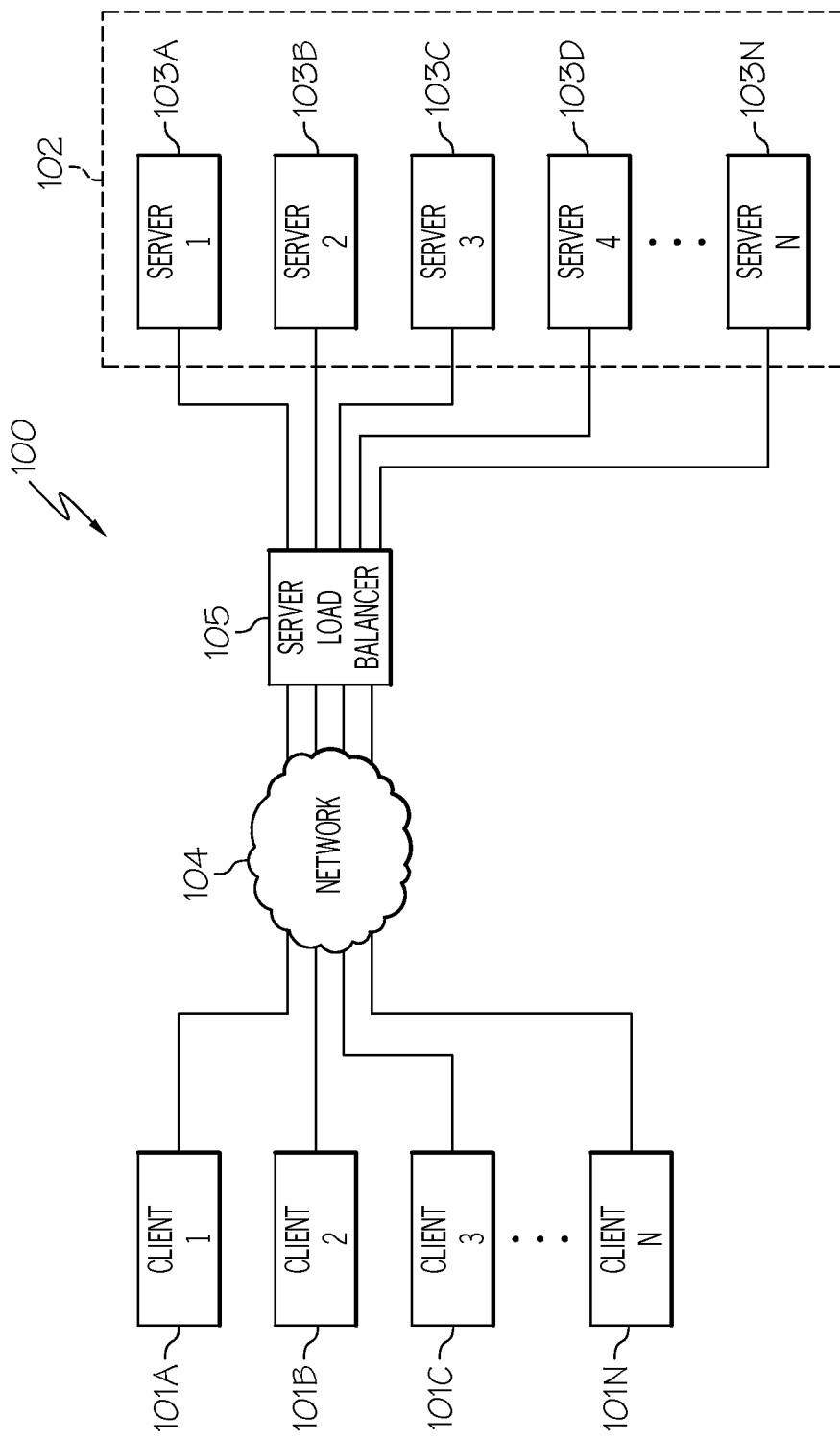
FIG. 1 illustrates an embodiment of the present invention of a load balancing system.

Referring now to the Figures in detail, FIG. 1 illustrates a load balancing system 100 for practicing the principles of the present invention in accordance with an embodiment of the present invention. Load balancing system 100 includes clients 101A-101N (where N can be any positive integer number) coupled to a server farm 102 that includes servers 103A-103N (where N can be any positive integer number) via a network 104 (e.g., local area network, wide area network). Clients 101A-101N may collectively or individually be referred to as clients 101 or client 101, respectively. Servers 103A-103N may collectively or individually be referred to as servers 103 or server 103, respectively.

Client 101 may be any type of device (e.g., wireless, Personal Digital Assistant (PDA), cell phone, personal computer system, workstation, Internet appliance) configured with the capability of connecting to network 104 and consequently communicating with server 103.

Load balancing system 100 further includes a server load balancer 105 interconnected with servers 103 in server farm 102 and clients 101. Server load balancer 105 is configured to optimize load balancing among servers 103 in server farm 102 using the principles of the present invention as discussed further below. That is, server load balancer 105 distributes requests from clients 101 to be serviced among servers 103 of server farm 102 in such as a manner as to optimize load balancing (i.e., optimize resource utilization, maximize throughput, minimize response time and avoid overload) among servers 103. A description of one embodiment of server load balancer 105 being in a hardware configuration is provided further below in connection with FIG. 2.

Load balancing system 100 is not to be limited in scope to the depiction of FIG. 1. Load balancing system 100 may be any type of system that has a server farm 102, at least one client 101, and a server load balancer 105.

Figure 2:
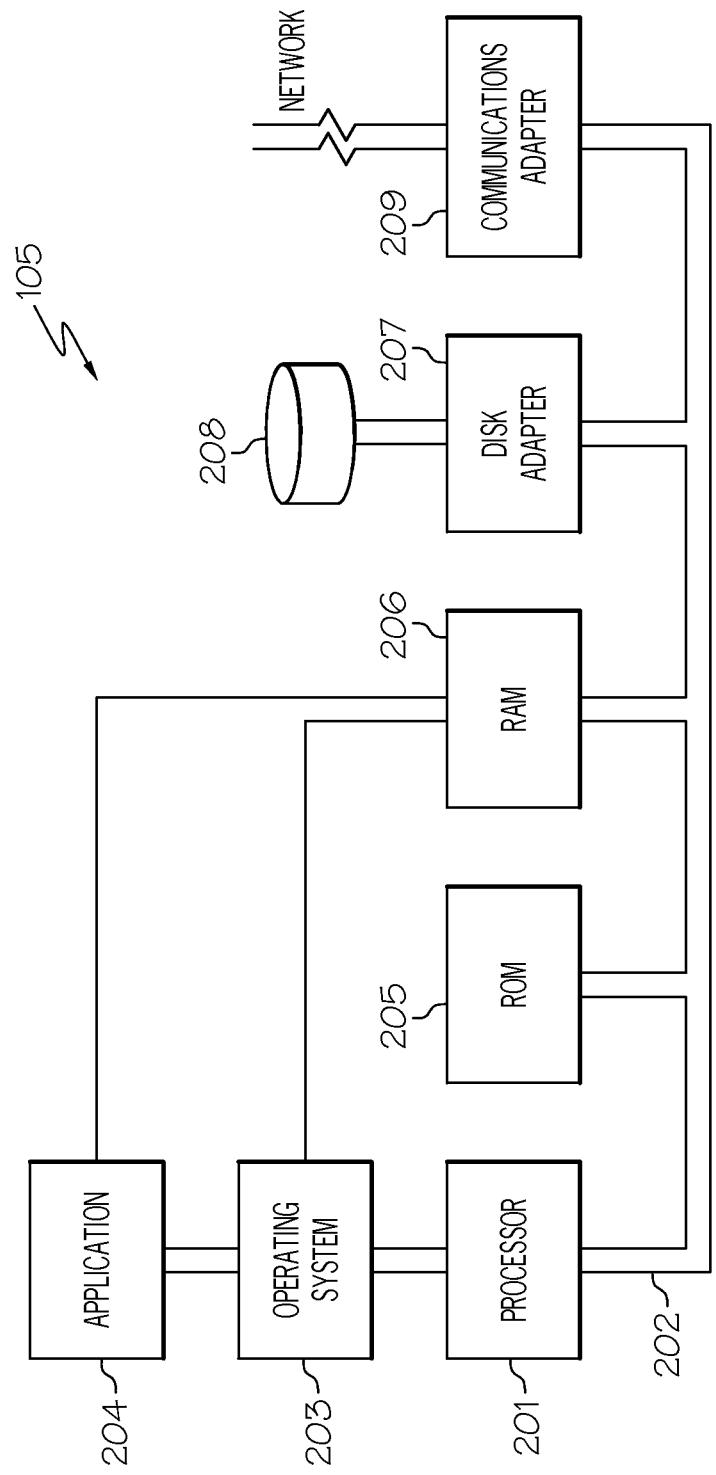
FIG. 2 is a hardware configuration of a server load balancer in accordance with an embodiment of the present invention.

Referring to FIG. 2, FIG. 2 illustrates an embodiment of a hardware configuration of a server load balancer 105 (FIG. 1) which is representative of a hardware environment for practicing the present invention. Referring to FIG. 2, server load balancer 105 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for balancing the loads of servers in a server farm as discussed further below in association with FIG. 3.

Referring again to FIG. 2, read-only memory ("ROM") 205 may be coupled to system bus 202 and include a basic input/output system ("BIOS") that controls certain basic functions of server load balancer 105. Random access memory ("RAM") 206 and disk adapter 207 may also be coupled to system bus 202. It should be noted that software components including operating system 203 and application 204 may be loaded into RAM 206, which may be load balancer's 105 main memory for execution. Disk adapter 207 may be an integrated drive electronics ("IDE") adapter that communicates with a disk unit 208, e.g., disk drive. It is noted that the program for balancing the loads of servers in a server farm as discussed further below in association with FIG. 3, may reside in disk unit 208 or in application 204.

Server load balancer 105 may further include a communications adapter 209 coupled to bus 202. Communications adapter 209 may interconnect bus 202 with an outside network (e.g., network 104) thereby allowing load balancer 105 to communicate with clients 101, servers 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the current load balancing techniques may not distribute the incoming client requests among the servers in the server farm in such a manner as to optimize load balancing (i.e., optimize resource utilization, maximize throughput, minimize response time and avoid overload).

Figure 3:
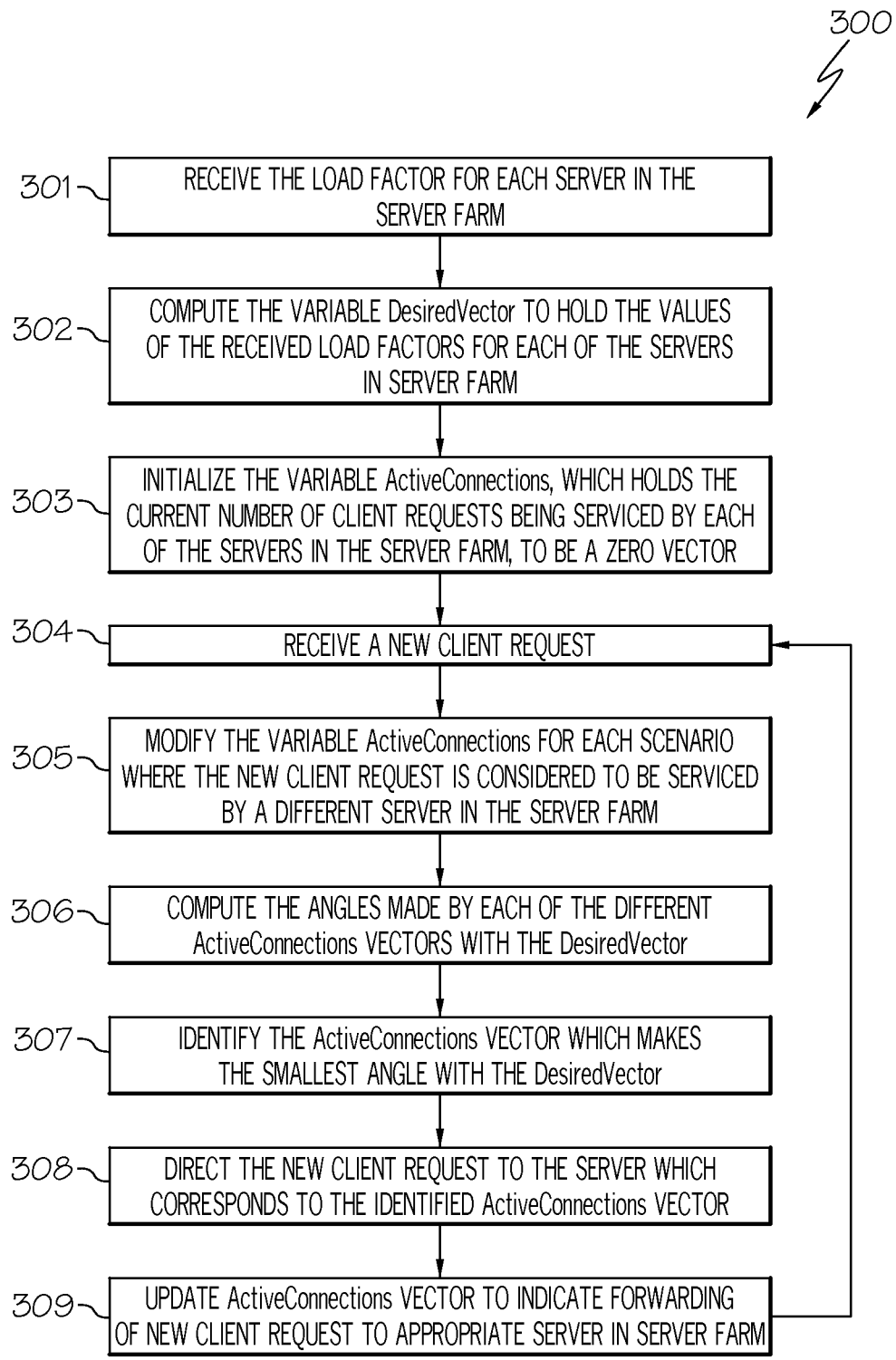
FIG. 3 is a flowchart of a method for balancing the loads of servers in the server farm in accordance with an embodiment of the present invention.

The principles of the present invention provide a current load balancing technique that optimizes load balancing by attempting to distribute the client requests as close as possible to the expected distribution using an angle between two vectors as discussed below in connection with FIG. 3. FIG. 3 is a flowchart of a method 300 for balancing the loads of servers 103 (FIG. 1) in a server farm 102 (FIG. 1) in accordance with an embodiment of the present invention.

Referring to FIG. 3, in conjunction with FIGS. 1-2, in step 301, load balancer 105 receives a load factor for each server 103 in server farm 102. In one embodiment, the load factor or server weight is a measure of the capacity of server 103 to service requests from clients 101 ("client requests"). That is, the load factor is a measure of the number of connections server 103 can service. In one embodiment, the load factor is a positive integer number ranging from 1 to 100, where a higher number indicates a greater capacity to service client requests than a lower number.

In step 302, load balancer 105 computes the vector variable, referred to herein as the "DesiredVector," to hold the values of the load factors received in step 301 for each server 103 in server farm 102. For example, suppose that there are four servers 103 in server farm 102 (e.g., servers 103A, 103B, 103C and 103D). Suppose further that the load factors assigned to servers 103A, 103B, 103C and 103D are 6, 2, 3 and 7, respectively. As a result, DesiredVector would be [6 2 3 7], where the first position in DesiredVector is associated with server 103A, the second position in DesiredVector is associated with server 103B and so forth.

In step 303, load balancer 105 initializes a vector variable, referred to herein as the ActiveConnections, to be a zero vector. In one embodiment, ActiveConnections holds the current number of client requests being serviced by each of the servers 103 in server farm 102. For instance, referring to the above example, since there are four servers 103 in server farm 102, ActiveConnections would be initialized to [0 0 0 0], where the first position in ActiveConnections is associated with server 103A, the second position in ActiveConnections is associated with server 103B and so forth.

In step 304, load balancer 105 receive a new client request.

In step 305, load balancer 105 modifies the variable ActiveConnections for each scenario where the new client request is considered to be serviced by a different server 103 in server farm 102. Referring to the example above, the variable ActiveConnections will initially be [0 0 0 0]. Upon receipt of the first client request, load balancer 105 will modify ActiveConnections for each scenario where the client request is serviced by a different server 103 in server farm 102. Hence, in the example of having four servers 103A-103D, load balancer 105 would generate four separate ActiveConnections for each case where the new client request is being directed to a different server 103 in server farm 102. For example, if the client request is directed to server 103A, then ActiveConnections would be [1 0 0 0]. If the client request is directed to server 103B, then ActiveConnections would be [0 1 0 0]. If the client request is directed to server 103C, then ActiveConnections would be [0 0 1 0]. And if the client request is directed to server 103D, then ActiveConnections would be [0 0 0 1].

In step 306, load balancer 105 computes the angles made by each of the different ActiveConnections vectors (computed in step 305) with the variable DesiredVector. For example, an angle between two vectors, A and B, is calculated by the following equation:

$$\text{angle} = \cos^{-1}((A \cdot B)/(|A||B|)), \tag{EQ1}$$

where A is equal to the variable DesiredVector and B is equal to one of the ActiveConnections computed in step 305, where A·B is the dot product of vectors A and B, and where |A| and |B| are the lengths (or norms) of the vectors.

For instance, referring to the example above, if DesiredVector equals [6 2 3 7] and the first of the four ActiveConnections vectors (client request directed to server 103A) equals [1 0 0 0], then the angle made by the ActiveConnections vector with the DesiredVector is equal to:

$$\cos^{-1}((6*1+2*0+3*0+7*0)/(((\text{square root}(6^2+2^2+3^2+7^2))*(\text{square root}(1^2+0^2+0^2+0^2)))),$$

which equals 52.69 degrees.

Similarly, the angles made by the other ActiveConnections vectors (client request directed to servers 103B, 103C and 103D) with the DesiredVector is equal to 78.34, 72.36 and 45 degrees, respectively.

In step 307, load balancer 105 identifies the ActiveConnections vector computed in step 306 which makes the smallest angle with the DesiredVector. Referring to the example above, the ActiveConnections vector [0 0 0 1], where the client request was directed to server 103D, made the smallest angle (45 degrees) with the DesiredVector.

In step 308, load balancer 105 directs the new client request to server 103 (e.g., server 103D) in server farm 102 which corresponds to the identified ActiveConnections vector.

The smaller the angle between the DesiredVector and the ActiveConnections vector implies the closer to the ideal distribution. By computing the angle between the DesiredVector and the ActiveConnections vector and directing the new client request to server 103 corresponding to the ActiveConnections vector which makes the smallest angle with the DesiredVector, the best possible distribution of requests among servers 103 of server farm 102 is made for every client connection. That is, the distribution of client requests is as close as possible to the expected distribution (the distribution shown in the DesiredVector).

In step 309, load balancer 105 updates the ActiveConnections vector to indicate the forwarding of the new client request to the appropriate server 103 in server farm 102. That is, load balancer 105 replaces the former ActiveConnections vector with the ActiveConnections vector identified in step 307.

Upon updating the ActiveConnections vector, load balancer 105 waits to receive a subsequent client request in step 304 and modifies the ActiveConnections vector as discussed above in step 305.

For instance, referring to the above example, suppose that the ActiveConnections vector is equal to [6 2 3 6] after receiving 17 client requests for the four servers 103A, 103B, 103C and 103D. Load balancer 105 will then modify ActiveConnections for each scenario where the client request is serviced by a different server 103 in server farm 102. Hence, if the client request is directed to server 103A, then ActiveConnections would be [7 2 3 6]. If the client request is directed to server 103B, then ActiveConnections would be [6 3 3 6]. If the client request is directed to server 103C, then ActiveConnections would be [6 2 4 6]. And if the client request is directed to server 103D, then ActiveConnections would be [6 2 3 7].

Load balancer 105 then computes the angles made by each of the different ActiveConnections vectors with the DesiredVector. Referring to the example above with the DesiredVector being [6 2 3 7], the angles made by the ActiveConnections vectors (client request directed to servers 103A, 103B, 103C and 103D) with the DesiredVector is equal to 8.19, 8.00, 8.12 and 0 degrees, respectively. The ActiveConnections vector [6 2 3 7], where the client request was directed to server 103D, made the smallest angle (0 degrees) with the DesiredVector. In this case, the distribution of client requests matches the expected distribution. Hence, load balancer 105 would direct the new client request to the server 103D corresponding to this ActiveConnections vector.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for balancing the loads of servers, the method comprising:
   receiving a load factor for each server in a server farm;
   computing a first vector to hold said load factor for each server in said server farm;
   receiving a client request;
   computing a plurality of second vectors, wherein each of said plurality of second vectors holds a number of client requests to be serviced by each server in said server farm taking into consideration said received client request, wherein each of said plurality of second vectors is computed by modifying a third vector to attribute said client request being serviced by a different server in said server farm, wherein said third vector holds a current number of client requests being serviced by each server in said server farm;
   computing an angle made by each of said plurality of second vectors with said first vector;
   identifying one of said plurality of second vectors which makes a smallest angle with said first vector; and
   directing, by a load balancer, said client request to a server in said server farm that corresponds to said identified second vector.

2. The method as recited in claim 1 further comprising:
   updating said third vector to indicate forwarding of said client request to said server in said server farm.

3. The method as recited in claim 1 further comprising:
   initializing said third vector to be a zero vector prior to receipt of a first client request.

4. The method as recited in claim 1, wherein each position in said first vector corresponds to said load factor for a particular server in said server farm, wherein each position in said third vector corresponds to a number of requests currently being serviced by said particular server in said server farm.

5. The method as recited in claim 1, wherein each position in each of said plurality of second vectors corresponds to a number of client requests to be serviced by a particular server in said server farm taking into consideration said received client request.

6. The method as recited in claim 1, wherein said angle made by each of said plurality of second vectors with said first vector is computed by the formula:

$$\cos^{-1}((A \cdot B)/(|A||B|)),$$

wherein A is equal to said first vector and B is equal to one of said plurality of second vectors.

7. The method as recited in claim 1, wherein said load factor is a positive integer ranging from 1 to 100.

* * * * *